United States Patent
Glanzmann-Zaugg et al.

(10) Patent No.: US 10,967,976 B2
(45) Date of Patent: Apr. 6, 2021

(54) VEHICLE SEAT HAVING AT LEAST ONE PNEUMATIC CUSHION

(71) Applicant: LANTAL TEXTILES AG, Langenthal (CH)

(72) Inventors: Manuela Glanzmann-Zaugg, Oberburg (CH); Thomas Hertig, Ruetschelen (CH); Andreas Guehmann, Madetswil (CH)

(73) Assignee: LANTAL TEXTILES AG, Langenthal (CH)

( * ) Notice: Subject to any disclaimer, the term of this patent is extended or adjusted under 35 U.S.C. 154(b) by 0 days.

(21) Appl. No.: 16/090,854

(22) PCT Filed: Dec. 8, 2016

(86) PCT No.: PCT/EP2016/080308
§ 371 (c)(1),
(2) Date: Oct. 3, 2018

(87) PCT Pub. No.: WO2017/174168
PCT Pub. Date: Oct. 12, 2017

(65) Prior Publication Data
US 2019/0106214 A1  Apr. 11, 2019

(30) Foreign Application Priority Data

Apr. 4, 2016 (CH) .................................... 00433/16

(51) Int. Cl.
*B64D 11/06* (2006.01)
*B60N 2/90* (2018.01)
(Continued)

(52) U.S. Cl.
CPC .......... *B64D 11/064* (2014.12); *B60N 2/0232* (2013.01); *B60N 2/20* (2013.01);
(Continued)

(58) Field of Classification Search
None
See application file for complete search history.

(56) References Cited

U.S. PATENT DOCUMENTS 4,629,248 A * 12/1986 Mawbey .................. B60N 2/62
297/284.11
4,773,703 A * 9/1988 Krugener ............. B60N 2/0284
297/284.1
(Continued)

FOREIGN PATENT DOCUMENTS

DE          44 31 573 A1    3/1995
DE   10 2010 020 642 A1    11/2011
(Continued)

OTHER PUBLICATIONS

Chinese Office Action dated Jul. 27, 2020 in corresponding Chinese Application No. 201680084261.3 with an English Translation.
(Continued)

*Primary Examiner* — David R Dunn
*Assistant Examiner* — Christopher E Veraa
(74) *Attorney, Agent, or Firm* — Birch, Stewart, Kolasch & Birch, LLP.

(57) ABSTRACT

The invention relates to a vehicle seat (1) comprising a seat surface (2) and at last one backrest element (3, 13) which are pivotable about an axis (6) relative to the seat surface (2). The at least one backrest element (3, 13) is movable from a sitting position, in which the backrest element (3, 13) is positioned substantially at an angle (a) relative to the seat surface (2), into a reclined position, in which the seat surface (2) and the at least one backrest element (3, 13) form a substantially planar surface, and back again. The vehicle seat (1) has at least one pneumatic cushion (10; 10.1, 10.2) and a pneumatic unit (9), which is configured in such a way that the pneumatic unit substantially completely inflates the at least one pneumatic cushion (10; 10.1, 10.2) if the at least
(Continued)

one backrest element (3, 13) is moved into the reclined position, and the at least one pneumatic cushion (10; 10.1, 10.2) is substantially completely emptied when the backrest element (3, 13) is moved into the sitting position. The at least one pneumatic cushion (10; 10.1, 10.2) is arranged in an edge region (8) of the seat surface (2) or of the at least one backrest element (3, 13), which adjoins the at least one backrest element (3, 13) or the seat surface (2), such that in the reclined position the at least one pneumatic cushion (10; 10.1, 10.2) extends between the seat surface (2) and the at least one backrest element (3, 13).

4 Claims, 3 Drawing Sheets

(51) Int. Cl.
  *B60N 2/34* (2006.01)
  *B60N 2/02* (2006.01)
  *B60N 2/20* (2006.01)
  *B60N 2/36* (2006.01)

(52) U.S. Cl.
  CPC .............. *B60N 2/34* (2013.01); *B60N 2/914* (2018.02); *B64D 11/0639* (2014.12); *B64D 11/0641* (2014.12); *B64D 11/0643* (2014.12); *B64D 11/0647* (2014.12); *B60N 2002/363* (2013.01)

(56) References Cited

U.S. PATENT DOCUMENTS

| | | | | |
|---|---|---|---|---|
| 5,370,444 | A * | 12/1994 | Stulik | A47C 1/023 297/284.11 |
| 5,975,636 | A | 11/1999 | Koch et al. | |
| 6,412,870 | B1 * | 7/2002 | Higgins | B60N 2/34 297/342 |
| 6,648,407 | B1 * | 11/2003 | Michel | B64D 11/06 297/111 |
| 9,039,085 | B2 * | 5/2015 | Aselage | B60N 2/0284 297/284.11 |
| 2004/0004383 | A1 * | 1/2004 | Laurent | B60N 2/34 297/354.13 |
| 2004/0232283 | A1 * | 11/2004 | Ferry | B60N 2/206 244/118.6 |
| 2008/0100109 | A1 * | 5/2008 | Frank | B60N 2/3081 297/238 |
| 2012/0146372 | A1 * | 6/2012 | Ferry | B64D 11/06 297/232 |
| 2013/0256072 | A1 * | 10/2013 | Farhat | A47C 4/52 190/2 |
| 2013/0340168 | A1 * | 12/2013 | Meyer | A61G 7/05776 5/615 |
| 2014/0265506 | A1 * | 9/2014 | McMillen | B60N 2/02 297/408 |
| 2015/0130244 | A1 | 5/2015 | Wyss | |
| 2016/0236597 | A1 * | 8/2016 | Dry | B60N 2/36 |
| 2017/0136922 | A1 | 5/2017 | Von Ballmoos et al. | |
| 2017/0151895 | A1 | 6/2017 | Von Ballmoos et al. | |

FOREIGN PATENT DOCUMENTS

| | | |
|---|---|---|
| EP | 2 944 509 A1 | 11/2015 |
| EP | 2 944 510 A1 | 11/2015 |
| JP | 7-47016 A | 2/1995 |
| WO | WO 2015/073363 A1 | 5/2015 |

OTHER PUBLICATIONS

Japanese Office Action dated Aug. 11, 2020 in corresponding Japanese Application No. 2018-552044 with an English Translation.

\* cited by examiner

VEHICLE SEAT HAVING AT LEAST ONE PNEUMATIC CUSHION

TECHNICAL FIELD

The invention relates to a vehicle seat having at least one pneumatic cushion which is inflated by means of a pneumatic unit when a rest element is moved into a reclined position and is deflated when the rest element is moved into a seating position.

PRIOR ART

The use of pneumatic cushions in vehicle seats, in particular in the field of aircraft seats, is known. A significant advantage of pneumatic cushions involves the reduced weight and the possibility of being able to adjust the hardness of the pneumatic cushions in accordance with external factors or the personal taste of a passenger seated on the vehicle seat.

For example, DE 10 2010 020 642 (Dornier Technologie GmbH & Co KG) describes an aircraft seat having an inclination sensor for the backrest, wherein with at least one inflatable air cushion, the pressure is regulated in accordance with the measured inclination angle of the backrest. The inclination sensor is preferably constructed as an absolute inclination sensor, which is integrated in a pneumatic unit of the seat. The pressure of the at least one inflatable air cushion can thereby be regulated in accordance with the absolute backrest angle with respect to the horizontal and not as in known systems with reference to the relative angle between the backrest and the seat face.

WO 2015/073363 discloses premium seats for aircraft, which can be moved from a seating position into a reclined position. The seats have a plurality of inflatable chambers which cushion a sleeping passenger during movements of the aircraft. The chambers are selectively inflated and deflated when the seats are moved between the positions.

DESCRIPTION OF THE INVENTION

An object of the invention is to provide a vehicle seat which belongs to the technical field mentioned in the introduction and which in a reclined position provides a higher level of reclining comfort.

The solution to the problem is defined by the features of claim 1. According to the invention, the vehicle seat comprises a seat face and at least one rest element which can be pivoted relative to the seat face about an axle. The at least one rest element can be moved from a seating position, in which the rest element is located substantially at an obtuse or reflex angle relative to the seat face, into a reclined position, in which the seat face and the rest element form a substantially planar face, and back again. Furthermore, the aircraft seat has at least one pneumatic cushion and a pneumatic unit which is constructed in such a manner that it substantially completely inflates the at least one pneumatic cushion when the at least one rest element is moved into the reclined position, and substantially completely deflates the pneumatic cushion when the at least one rest element is moved into the seating position. The at least one pneumatic cushion is arranged in an edge region of the seat face or of the at least one rest element, said edge region being adjacent to the at least one rest element or the seat face so that the at least one pneumatic cushion extends in the reclined position between the seat face and the at least one rest element.

A potential gap between the seat face and the at least one rest element which is produced through the movement of the rest element into the reclined position can thereby be bridged. Hence, in the reclined position the vehicle seat forms a continuous surface for a passenger which has substantially the same sensation of hardness throughout.

Preferably, the at least one rest element is a backrest or a leg support. In a preferred embodiment, the vehicle seat has two rest elements which form a backrest and a leg support of the vehicle seat.

In addition to the seat face and the backrest and/or the leg support, the vehicle seat preferably comprises additional elements, such as, for example, a headrest, armrests, an ottoman, et cetera. The seat face and the at least one rest element have upholstery. This upholstery preferably comprises at least one pneumatic cushion. Alternatively, the upholstery of the seat face and/or the at least one rest element may also comprise foam material. In a further alternative manner, the upholstery of the seat face and/or the at least one rest element may also have at least one pneumatic cushion and foam material. The vehicle seat further has a substructure by means of which the vehicle seat can be connected to a base of the vehicle.

In order to pivot the at least one rest element relative to the seat face, the vehicle seat has a corresponding axle and an adjustment mechanism, by means of which the at least one rest element can be moved. The adjustment mechanism preferably enables in a first configuration a locking of the at least one rest element relative to the seat face, whilst the adjustment mechanism in a second configuration enables a pivoting of the at least one rest element relative to the seat face.

If the rest element is a backrest, it is located in a seating position preferably at an obtuse angle relative to the seat face. This means that the angle between the seat face and backrest is from 90° to 180°. In specific embodiments, however, there may also be provision for the backrest to additionally be able to be located at an acute angle, that is to say, an angle between 0° and 90° relative to the seat face.

If the rest element is a leg support, it is located in a seating position preferably at a reflex angle relative to the seat face. This means that an angle greater than 180° is formed between the seat face and leg support. In a seating position, the leg support is preferably arranged at an angle of 270° relative to the seat face.

Preferably, the vehicle seat is configured in such a manner that the angle between the seat face and the at least one rest element in the seating position can be varied. For example, the adjustment mechanism may be configured in such a manner that it enables locking of the at least one rest element at any obtuse or reflex angle relative to the seat face. Alternatively, the adjustment mechanism may also enable the locking of the at least one rest element only at a predetermined number of predefined angles.

In the reclined position, the angle between the seat face and the at least one rest element is substantially 180°. The seat face and the at least one rest element thereby form for the passenger sitting on the vehicle seat or reclining in this position a substantially planar surface.

In the present application, the term "substantially planar" is intended to be understood to refer to a planar plane, wherein this plane depending on the contouring of the seat face or the at least one rest element may also have specific regions which have a slight curvature, for example, toward the center of the seat face or the rest element. Furthermore, as a result of play on the pivot axle of the at least one rest element when moving between the seat face and the rest element, a small height offset may be present.

A "pneumatic cushion" is intended in the present application to be understood to be a cushion which is formed by means of at least two flexible side faces which are connected to each other in an airtight manner in the edge regions thereof and into the volume of which air can be pumped in order to obtain a three-dimensional soft structure with upholstery properties. The side faces are preferably present as individual surface elements. Alternatively, the at least two side faces may comprise a single surface element which has corresponding folds.

Furthermore, the term "pneumatic cushion" in the present application is also intended to be understood to be a cylindrical volume which is surrounded by a single, bent surface element which is connected to itself in an airtight manner at three edges.

In a particularly preferred embodiment, the at least one pneumatic cushion is substantially parallelepipedal and therefore has six side faces which are formed in particular by means of six separate surface elements. In alternative variants, however, the at least one pneumatic cushion may also be round, oval or any polygonal shape.

The at least two side faces preferably comprise at least one polymer material. Alternatively, the at least two side faces may also comprise a textile, wherein in this instance the textile is provided with an airtight layer. The at least two side faces preferably have desired folding locations so that they fold together in a predetermined manner during the deflation. Alternatively, the at least two side faces may also comprise a resilient material.

The pneumatic unit preferably has a pump, by means of which air can be conveyed into the at least one pneumatic cushion. Furthermore, the pneumatic unit also has at least one valve, by means of which the pump can be selectively brought by means of at least one fluid line into fluid connection with the at least one pneumatic cushion. Preferably, the pneumatic unit has a control unit by means of which the pump and the at least one valve can be controlled.

If the vehicle seat comprises a plurality of pneumatic cushions, these are preferably connected to the pump by means of a valve block in which at least one valve is present per pneumatic cushion. Alternatively, a plurality of pneumatic cushions may also be connected to the pump via the same valve. The pneumatic unit may in particular also be used to adapt the filling volume of pneumatic cushions in the upholstery of the vehicle seat. A large number of comfort functions can thus be controlled with only one pneumatic unit.

Preferably, a pneumatic unit is associated with each vehicle seat. Alternatively, however, there may also be provision for two or more vehicle seats, which are arranged, for example, as a seat row beside each other, to have a common pneumatic unit. Furthermore, for each vehicle seat a plurality of pneumatic units may also be present, for example, one pneumatic unit for each pneumatic cushion which is present.

Preferably, the vehicle seat has a sensor by means of which a movement of the at least one rest element between the seating position and the reclined position, or vice versa, can be detected in order to correspondingly inflate or deflate the at least one pneumatic cushion. The sensor is preferably electrically connected to the pneumatic unit in order to transmit corresponding sensor data thereto. Preferably, the inflation or the deflation of the at least one pneumatic cushion is controlled by means of an electronic input unit which can be operated by a user of the vehicle seat in accordance with the angular position of the at least one rest element as adjusted by the user.

The at least one pneumatic cushion is preferably arranged on an edge of the seat face and/or the at least one rest element. In a particularly preferred manner, the at least one pneumatic cushion is adhesively bonded or welded to an upholstery of the seat face and/or the rest element. A particularly secure connection between the at least one pneumatic cushion and the seat face or the rest element can thereby be achieved. Alternatively, the at least one pneumatic cushion may also be connected to the seat face and/or to the at least one rest element using other connection techniques, such as, for example, by means of a seam, a zip or a hook and loop fastening. In another preferred embodiment, the at least one pneumatic cushion may also be arranged loosely inside a cover, which surrounds the seat face and the at least one rest element, for example, inside a flame-resistant textile cover.

Preferably, the vehicle seat has at least one textile cover which is tensioned over the seat face and the at least one rest element and the at least one pneumatic cushion. A visually uniform surface is thereby achieved. Furthermore, the at least one textile cover protects the upholstery and the at least one pneumatic cushion from contamination and/or damage. Furthermore, a flame-retardant layer, in particular a flame-resistant textile cover, is fitted around the seat face, the at least one rest element and the at least one pneumatic cushion in order to increase the safety which is important and also compulsory in mass transportation means.

The vehicle seat according to the invention is preferably used in mass transportation means, such as trains, buses, ships or aircraft. Alternatively, however, the vehicle seat according to the invention may also be used in private transport means, such as passenger vehicles or trucks.

Preferably, the vehicle seat has an actuator, by means of which the angle of the at least one rest element can be adjusted in a motorized manner relative to the seat face, wherein the pneumatic unit on the basis of the status of this actuator inflates or deflates the at least one pneumatic cushion.

The use of an actuator increases the comfort since a displacement of the at least one rest element into the reclined position and back into the seating position can be carried out by pressing a button. In another preferred embodiment, the actuator may also displace the seat face in a linear manner in the seat direction so that depending on space relationships an optimum configuration of the vehicle seat can be achieved. If the vehicle seat also has other elements, these may also be moved by means of the actuator or via additional actuators.

Suitable actuators for vehicle seats are known to a person skilled in the art in the field. For example, spindles which are driven by means of a motor can be used as actuators.

The pneumatic unit is preferably connected to a control unit of the actuator so that it receives from the control unit a signal which signals the movement to the reclined position. Alternatively, the pneumatic unit has a sensor which measures the relative position of a movable portion of the actuator, for example, a spindle. In the event of detection by the sensor of a passage of this movable portion through a specific position, the inflation or deflation of the at least one pneumatic cushion is initiated. In another alternative embodiment, a sensor may also be arranged on the vehicle seat and measures the relative position of the at least one rest element and accordingly transmits signals to the pneumatic unit.

Preferably, the pneumatic unit has a pump by means of which the at least one pneumatic cushion can be both inflated and deflated.

An active deflation of the at least one pneumatic cushion by the pump is thereby possible, which significantly accelerates the deflation operation. To this end, in a particularly preferred manner a pump having two conveying directions is used.

A "pump having two conveying directions" is intended to be understood in the context of the present application to be a pump which is capable of both pumping up and actively deflating the pneumatic cushion.

Alternatively, a pump having only one conveying direction can also be used, wherein in this instance an active deflation of the at least one pneumatic cushion can be achieved by means of a corresponding arrangement of lines and valves.

Preferably, a diaphragm pump is used as a pump. The diaphragm pump preferably comprises an electric drive.

Alternatively, the pump may also be a flow pump which enables continuous delivery of the fluid. The pump may, for example, be constructed as a rotary piston pump, rotary vane pump or impeller pump.

Preferably, the at least one pneumatic cushion has a pressure sensor which measures the pressure inside the at least one pneumatic cushion, wherein the pneumatic unit is constructed in such a manner that, when the value exceeds or falls below a predetermined set pressure, it deflates or inflates the at least one pneumatic cushion until the set pressure is reached.

This increases the safety and the comfort of a passenger seated on the vehicle seat since the quantity of air provided in the at least one pneumatic cushion is readjusted, for example, if the at least one pneumatic cushion during inflation unexpectedly strikes an object in its path. As a result of such an object, the at least one pneumatic cushion cannot unfold to its complete volume, whereby with the air volume remaining consistent the internal pressure increases. This may lead to the at least one pneumatic cushion feeling excessively hard for the passenger in comparison with the remainder of the seat. Furthermore, an excessive overpressure may also lead to damage or even bursting of the at least one pneumatic cushion. With an active readjustment of the internal pressure to a predetermined set pressure, these disadvantages are prevented.

Furthermore, with this embodiment in aircraft seats, pressure differences which originate from the cabin pressure which changes in accordance with the flight phase can also be compensated for, whereby the at least one pneumatic cushion always feels uniformly hard for a passenger.

The pressure sensor is preferably arranged inside the pneumatic cushion. Alternatively, however, the pressure sensor may also be arranged in a line or a valve block between the pump and the pneumatic cushion. It only has to be ensured that the pressure sensor can measure the pressure inside the pneumatic cushion.

The present application further relates to the use of a vehicle seat according to the invention in an aircraft. When used in an aircraft, the vehicle seat according to the invention preferably has upholstery which has at least one pneumatic cushion in order to reduce the overall weight of the vehicle seat.

Other advantageous embodiments and feature combinations of the invention will be appreciated from the following detailed description and all the patent claims.

BRIEF DESCRIPTION OF THE DRAWINGS

In the drawings which serve to explain the embodiment.

In principle, components which are identical in the Figures are given the same reference numerals.

METHODS FOR IMPLEMENTING THE INVENTION

Figure 1:
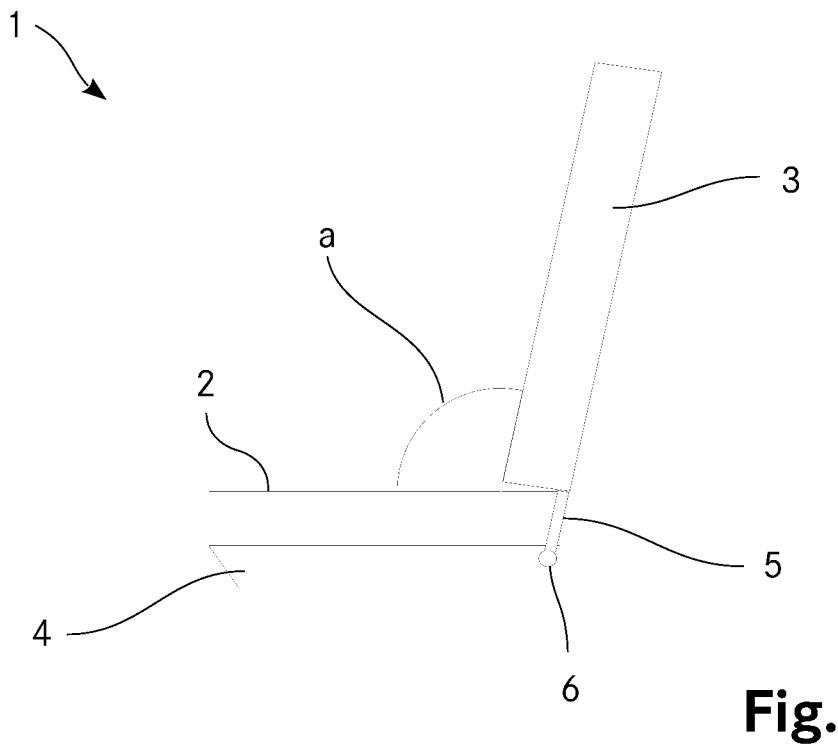
FIG. 1 is a schematic illustration of a vehicle seat from the prior art with the backrest in a seating position.

FIG. 1 is a schematic illustration of a vehicle seat 1 according to the prior art. The vehicle seat 1 has a seat face 2 having upholstery and a backrest 3 having upholstery. The backrest 3 constitutes in this instance a rest element which can be adjusted relative to the seat face 2. The vehicle seat 1 has a substructure 4 which is only schematically illustrated in this instance. The backrest 3 is located in FIG. 1 in the seating position, wherein the backrest 3 is located at an obtuse angle a relative to the seat face 2. Furthermore, the backrest 3 is connected by means of a strut 5 to a pivot axle 6, which enables pivoting of the backrest 3 relative to the seat face 2. The backrest 3 can thereby assume different angles a relative to the seat face 2. An adjustment mechanism (not illustrated) which enables locking of the backrest at different angles a relative to the seat face 2 acts on the pivot axle 6. The adjustment mechanism may have an actuator by means of which the backrest 3 can be pivoted in a motorized manner relative to the seat face 2.

Figure 2:
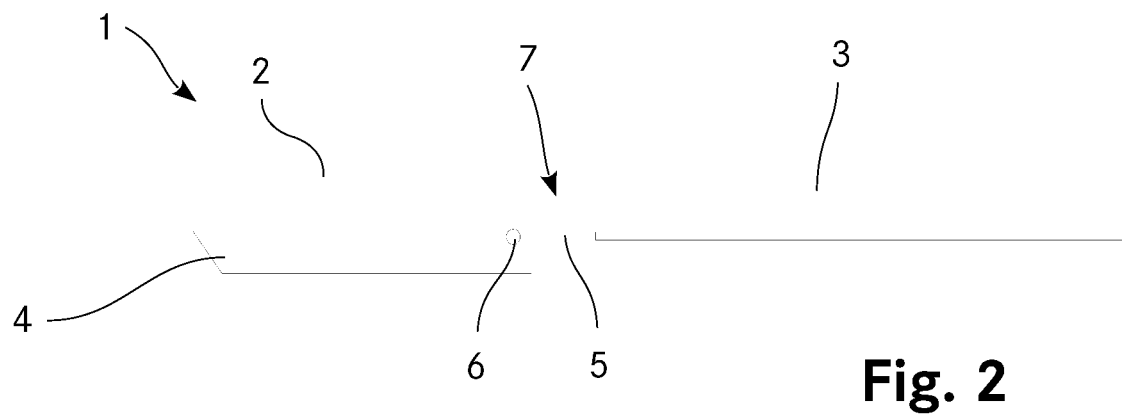
FIG. 2 shows the vehicle seat from FIG. 1 in the reclined position.

FIG. 2 shows the vehicle seat 1 according to FIG. 1 with the backrest 3 in a reclined position, wherein the backrest 3 and the seat face 2 form a substantially planar surface for a passenger (not shown) seated on the vehicle seat. As a result of the arrangement of the pivot axle 6 on the substructure 4, when the backrest 3 is pivoted, a gap 7 is produced between the seat face 2 and the backrest 3. This gap 7 feels unpleasant for a passenger (not shown) reclining on the vehicle seat.

Figure 3:
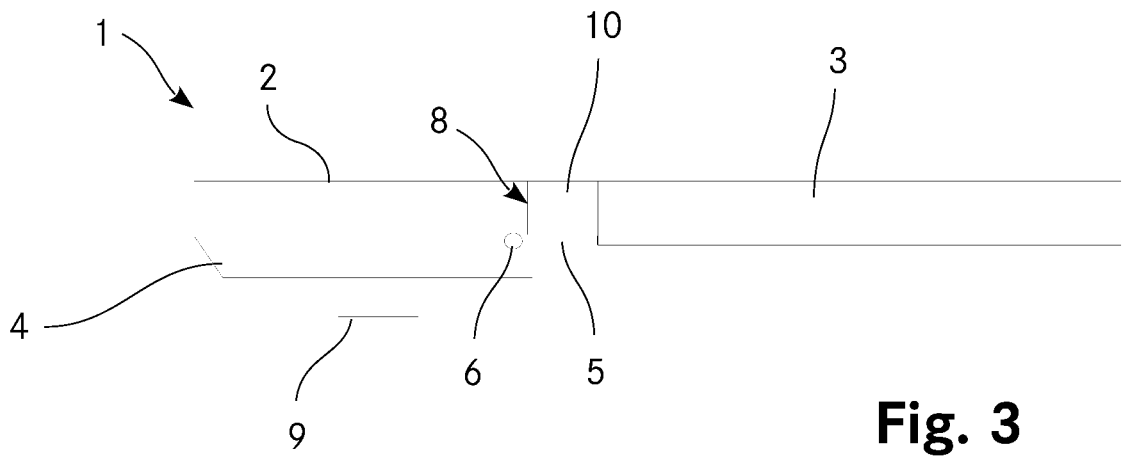
FIG. 3 shows a first embodiment of the vehicle seat according to the invention in the reclined position.

FIG. 3 shows a first embodiment of a vehicle seat 1 according to the invention. In order to close the gap 7 according to FIG. 2, the vehicle seat 1 according to the invention has a pneumatic cushion 10 which in a rear edge region 8 of the seat face which is adjacent to the backrest 3—the rest element of the vehicle seat 1—is secured to the edge. When the backrest 3 is moved into the reclined position, the pneumatic cushion 10 is inflated by a pneumatic unit 9. The pneumatic cushion 10 is configured in this instance in such a manner that in the inflated state it forms a planar face with the seat face 2 and the backrest 3. Via the pneumatic unit 9, other pneumatic cushions (not shown) which are arranged on the seat or in the upholstery of the seat face 2 and/or the backrest 3 may be inflated or deflated.

Figure 4:
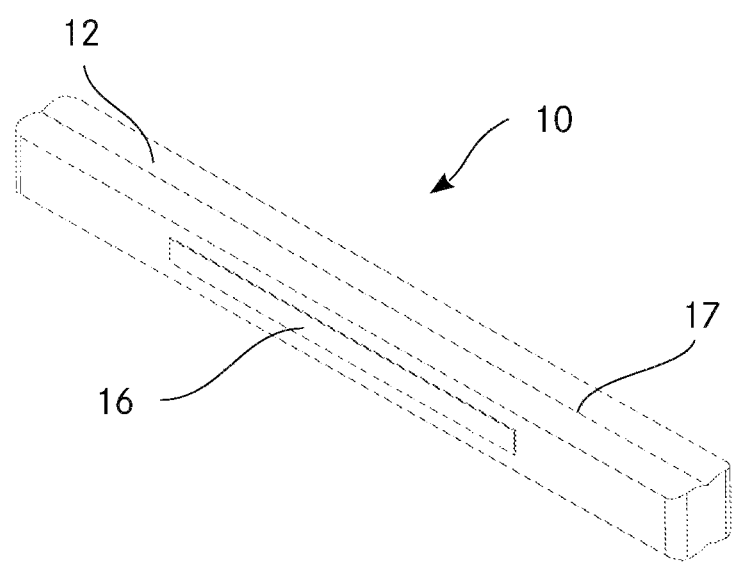
FIG. 4 is a detailed illustration of a pneumatic cushion.

FIG. 4 is a more detailed illustration of an embodiment of a pneumatic cushion 10 which can be used in a vehicle seat 1 according to the invention. The pneumatic cushion has a closed sheath 12. On an outer face of the sheath 12, there is arranged a retention means 16 by means of which the pneumatic cushion 10 can be secured to an edge of a seat face 2 or a rest element. In the embodiment shown, the retention means 16 is constructed as a hook and loop strap. The sheath 12 of the pneumatic cushion further has a desired folding location 17 which facilitates the folding-together of the sheath 12 of the pneumatic cushion 10 during the deflation operation.

Figure 5:
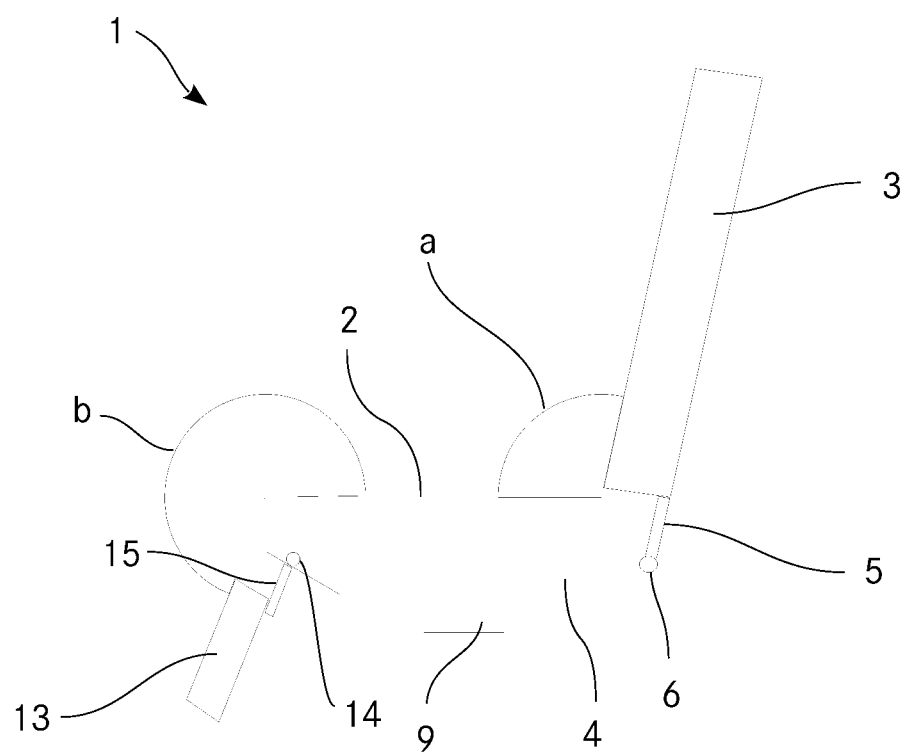
FIG. 5 is a second embodiment of the vehicle seat according to the invention in a seating position.

FIG. 5 shows a second embodiment of a vehicle seat 1 according to the invention. In contrast to the embodiment according to FIG. 3, the vehicle seat of this embodiment has in addition to the backrest 3 a second rest element in the form of a leg support 13. The leg support 13 is connected by means of a second strut 15 to a second pivot axle 14. The leg support 13 can be adjusted in a similar manner to the backrest 3 at an angle relative to the seat face 2. The leg support 13 is located in this instance at a reflex angle b relative to the seat face 2.

Figure 6:
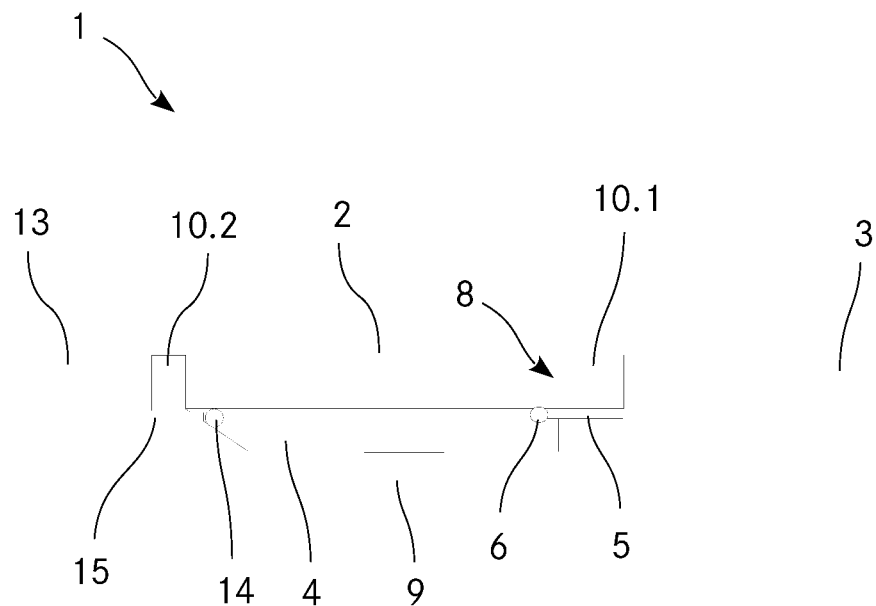
FIG. 6 shows the vehicle seat according to FIG. 5 in the reclined position.

As shown in FIG. 6, the second embodiment of the vehicle seat 1 according to the invention again has a first pneumatic cushion 10.1 which is arranged on an edge of the seat face 2 which is directed toward the backrest 3. By inflating this first pneumatic cushion 10.1, a gap between the seat face 2 and the backrest can be closed. In the same manner, at another edge of the seat face 2 which is directed toward the leg support 13, there is arranged a second pneumatic cushion 10.2 which is inflated during movement into a reclined position in order to fill a gap between the leg support 13 and the seat face 2. By means of the two pneumatic cushions 10.1, 10.2, it is thus possible with the leg support 13, the seat face 2 and the backrest 3 to form a continuous planar reclining surface.

The invention claimed is:

1. A vehicle seat comprising a seat face and at least one rest element which can be pivoted relative to the seat face about an axle, wherein the at least one rest element can be moved from a seating position, in which the rest element is located substantially at an obtuse or reflex angle relative to the seat face, into a reclined position, in which the seat face and the at least one rest element form a substantially planar face, and back again, and wherein the vehicle seat has at least one pneumatic cushion and a pneumatic unit which is constructed in such a manner that it substantially completely inflates the at least one pneumatic cushion when the at least one rest element is moved into the reclined position, and substantially completely deflates the at least one pneumatic cushion when the at least one rest element is moved into the seating position, wherein the at least one pneumatic cushion is arranged in an edge region of the seat face or of the at least one rest element, said edge region being adjacent to the at least one rest element or the seat face so that the at least one pneumatic cushion extends between the seat face and the at least one rest element in the reclined position and wherein the at least one pneumatic cushion has a pressure sensor which measures the pressure inside the at least one pneumatic cushion and the pneumatic unit is constricted in such a manner that, when the pressure exceeds or falls below a predetermined set pressure, the at least one pneumatic cushion is deflated or inflated until the set pressure is reached.

2. The vehicle seat as claimed in claim 1, wherein the at least one rest element is a backrest, a leg support, or both.

3. The vehicle seat as claimed in claim 1, wherein the vehicle seat has an actuator including a spindle which is driven by a motor, by means of which the angle of the at least one rest element can be adjusted in a motorized manner relative to the seat face, wherein the pneumatic unit is constructed in such a manner that on the basis of the status of the actuator it inflates or deflates the at least one pneumatic cushion.

4. The vehicle seat as claimed in claim 1, wherein the pneumatic unit has a pump, by means of which the at least one pneumatic cushion can be both inflated and deflated.

* * * * *